United States Patent [19]
Yates et al.

[11] Patent Number: 5,407,125
[45] Date of Patent: Apr. 18, 1995

[54] REUSABLE GIFT WRAPPING

[76] Inventors: Helen Yates, 2211 N. 77th; Diane Elliott, 2201 N. 77th, both of Kansas City, Kans. 66109

[21] Appl. No.: 21,299

[22] Filed: Feb. 23, 1993

[51] Int. Cl.6 .......................................... B65D 65/00
[52] U.S. Cl. ............................... 229/87.19; 229/923
[58] Field of Search ................... 229/87.19, 923, 87.18

[56] References Cited

U.S. PATENT DOCUMENTS

| | | | |
|---|---|---|---|
| 1,291,480 | 1/1919 | Gore | 229/87.18 |
| 3,355,092 | 11/1967 | LePain | 229/87.19 |
| 3,366,313 | 1/1968 | Culberg et al. | 229/87.19 |
| 3,790,069 | 2/1974 | Straccamore | 229/87.19 |
| 5,004,144 | 4/1991 | Selga | 229/923 |

*Primary Examiner*—Stephen P. Garbe
*Attorney, Agent, or Firm*—Kokjer, Kircher, Bowman & Johnson

[57] ABSTRACT

A reusable package wrapping consisting of an area of substantially flexible or flaccid material which may be folded into a covering relation about a gift package. An exterior face of the material may include aesthetically pleasing patterns or designs. The material may be cleaned, as by standard material washing techniques, such that its appearance may be retained for multiple uses. Attachment elements are provided at various locations on the material for attachment to the package or to the material itself. Where the material is intended to be attached to itself the attachment elements may be of the mating variety.

5 Claims, 1 Drawing Sheet

REUSABLE GIFT WRAPPING

BACKGROUND OF THE INVENTION

1. Field of the Invention

The present invention relates in general to materials for wrapping or covering products. In particular, the present invention relates to an improved wrapping for gifts.

2. Description of the Related Art

It has long been a custom to cover or wrap gifts in wrapping paper. The use of such paper provides an aesthetically pleasing package and helps to ensure that the gift is a surprise to the recipient. However, the use of such wrapping paper is not environmentally sound.

In particular, wrapping papers are often torn or unduly crumpled once they have been removed from the gift package. While some individuals reuse such papers, they are typically considered disposable. However, many communities do not recycle slick paper items, and as such the papers often generate refuse which must be incinerated or placed in a landfill. Since the demand for gift wrappings is rather steady, the disposal of a large percentage of used papers requires the cutting of trees to generate new stock paper.

Additionally, the bleaching and printing processes to provide a pleasing pattern generate or employ known toxic chemicals which will inevitably be released to the environment through inadvertence. While recycled paper could be employed to reduce the need to cut trees, the bleaching and printing processes are still necessary to provide a sufficiently attractive pattern for most consumers.

SUMMARY OF THE INVENTION

An object of the present invention is to provide an aesthetically pleasing gift wrapping.

Another object of the present invention is to provide such a wrapping which may be easily reused with little or no degradation in appearance.

Yet another object of the present invention is to provide such a wrapping which includes integral attachment elements to retain the wrapping in place upon the package.

These and other objects are achieved by a reusable package wrapping consisting of an area of substantially flexible or flaccid material which may be folded into a covering relation about a gift package. An exterior face of the material may include aesthetically pleasing patterns or designs. The material may be cleaned, as by standard material washing techniques, such that its appearance may be retained for multiple uses. Attachment elements are provided at various locations on the material for attachment to the package or to the material itself. Where the material is intended to be attached to itself the attachment elements may be of the mating variety.

BRIEF DESCRIPTION OF THE DRAWINGS

The objects and features of the invention noted above are explained in more detail with reference to the drawings in which like reference numerals denote like elements, and in which.

DETAILED DESCRIPTION OF THE INVENTION

Figure 1:
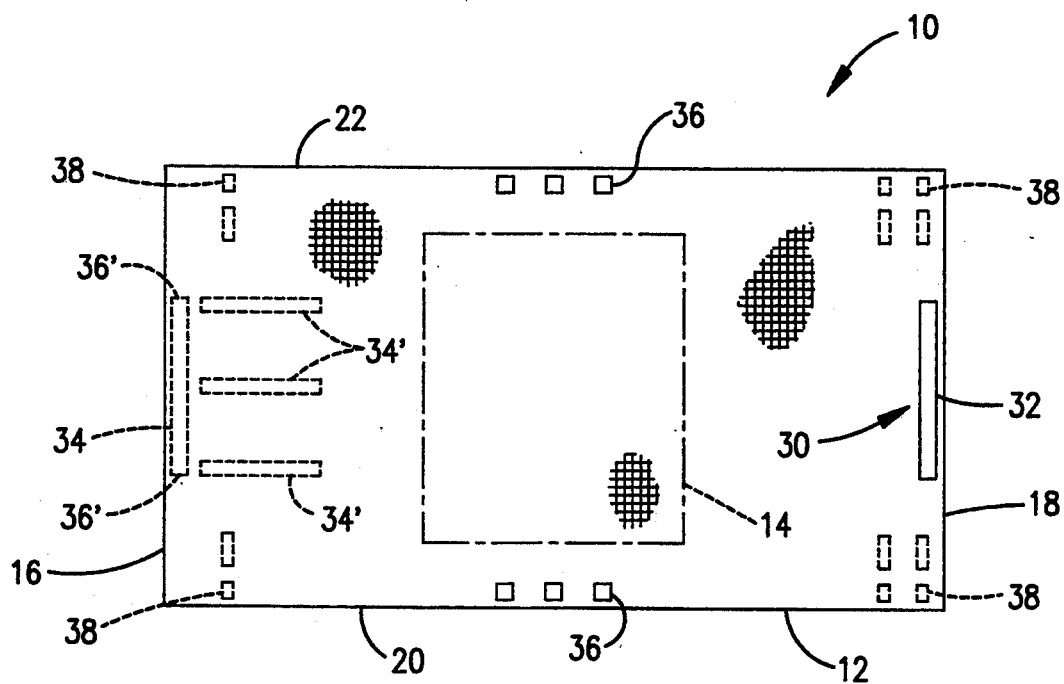
FIG. 1 is a plan view of the wrapping according to the present invention.
Figure 2:
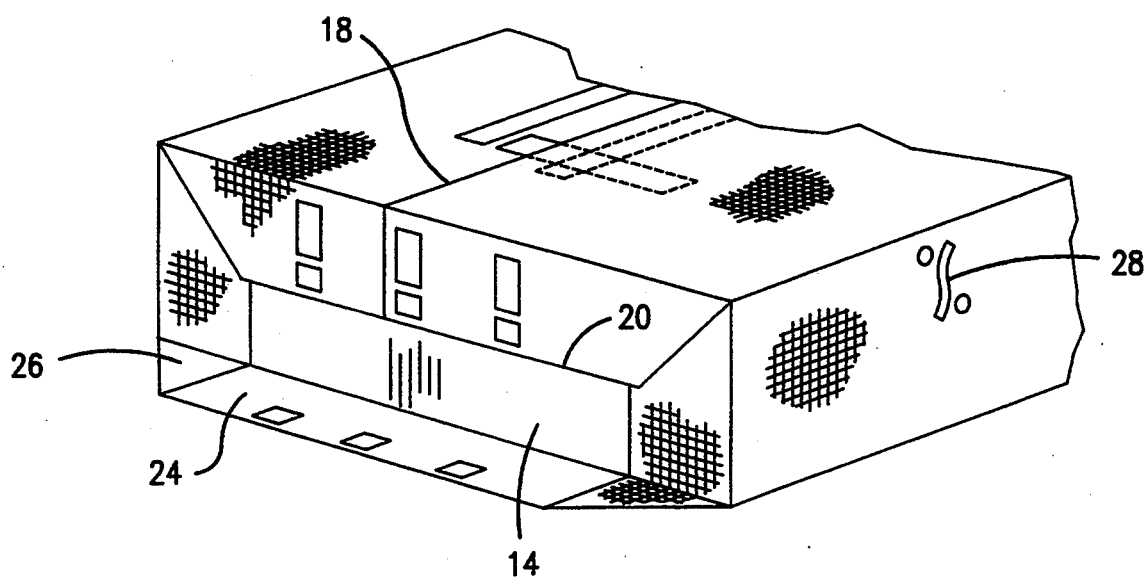
FIG. 2 is a detail perspective view of the wrapping according to the present invention partially covering a package.

With reference to FIG. 1, a wrapping according to the present invention is generally designated by reference numeral 10. The wrapping includes an area 12 of material having at least localized areas of at least substantial flexibility. Material 12 is intended to wrap about, and substantially conform to in covering relation, a package or article 14 (FIG. 2). Such a wrapping of the material about the package is intended to be effected by various folds, as is known with prior art wrapping paper, and as is described in more detail below.

The particular characteristics of the package have an influence upon the characteristics of the area 12. For example, since the material is preferred to completely surround the package, the physical size of the material is determined by the package or article dimensions. While the broad categories of articles and packages encompass an enormous range of shapes and sizes, a significant percentage of articles and packages given as personal gifts have sizes and shapes within much more determinable ranges, and there are many package sizes which are standardized. A leading example of this is the common shirt or clothing box. As such, it is envisioned that various models of area 12 may be produced, each having a unique peripheral shape and/or dimensions, with a significant percentage of articles or packages given as personal gifts being capable of use with at least one of the models of area 12.

The particular shape shown in the figures is well suited to the common shirt or clothing box. In particular, the area 12 has a substantially rectangular periphery including first and second longitudinal ends 16 and 18, and first and second lateral sides 20 and 22. In its most simple form the area 12 is essentially a sheet of the material, and includes an inner face 24 and an outer face 26.

It is to be understood that the use of the singular forms of "sheet" and "material" are with reference to the gross characteristics of the area 12, and are intended to encompass configurations other than one monolithic piece of fabric. For example, the area 12 could be formed of two or more sheets of similar or diverse materials laid one upon the other with or without quilting, a patchwork of numerous diverse fabrics, or other arrangements. Additional elements could also be added to the inner or outer faces for a three dimensional appearance. For example a quilted figure could be fixed to the outer face such that it extends outward from, or beyond the folded edges of, the wrapped package.

As noted above, the area 12 is intended to be folded about the package. The particular folding arrangement will of course vary with the particular package with which the area is employed, which may vary through the life of the area. As such it may be preferred that the area be formed of material which is flexible throughout its extent. This will allow various folding line arrangements and locations.

It is possible, however, to tailor certain of the models of the area for particular, very common, package sizes, such as the shirt box. In such a dedicated model the fold lines will be substantially constant for each use, and as such the portions not comprising the fold line need not be substantially flexible. In other words, the area includes localized portions of at least substantial flexibility.

While this arrangement is feasible, it must be tempered with the possible need for cleaning the area 12 between uses. If the area is to be capable of washing within a standard home washing machine and dryer, any areas which are substantially rigid should not be so large as to interfere with cleaning in such washers and dryers. However, if a material is used which allows hand cleaning with a damp sponge, such as one having a thick latex or rubberized coating, there is no need to limit the size of the rigid portions.

The outer face 24 of the area will be visible when the area is in covering relation to the package. The outer face may therefore include various patterns or indicia 28 which are aesthetically pleasing. While such indicia could be considered matters of design, the formation of the design will include structural configurations which are encompassed within the present invention. For example a printed fabric will include a base fabric and inks or dyes. The indicia could alternatively be formed by patchwork, quilting, cutouts in an exterior sheet which allow viewing of an interior sheet, etc.

While the aesthetic appearance of the area may vary, it is preferred that the area be at least substantially opaque, such that any markings upon the package 14 are not visible through the material forming area 12. This will help to conceal the identity of the package or article 14, allowing the gift to be a surprise. This may require the use of two layers of material in many cases.

The area 12 is retained in covering relation upon the package by releasable retaining elements, generally designated by reference numeral 30, mounted upon the area 12. The retaining elements may be capable of releasably attachment to the package 14 itself, such as by use of pressure sensitive adhesive portions. However, it is preferred that they take the form of mating fasteners such that the area 12 is affixed to itself.

There are a large number of suitable mating fasteners, such as buttons or snaps which may be employed. In view of the desire to form an aesthetically pleasing package, and to clean the area 12 by use of standard methods, it is preferred to employ hook and loop fasteners of the type commercially known as Velcro ®. Such hook and loop fasteners are easy to affix together, may be reused many times and have additional advantages made apparent below.

The particular arrangement of the mating fasteners will of course be determined by the particular fold arrangement used for the area 12 and upon the size of the package. The arrangement shown in the figures works well with a typical fold arrangement used with wrapping paper (described below), which may be employed with a large number of packages and articles.

In particular, at least one end strip 32 of hook material is centered in the lateral direction on inner face 24 in proximity to the second end 18. Mating loop material end strip 34 is similarly laterally centered adjacent the first end 16, but is located on the outer face 26. The strips 32 and 34 should have a length not exceeding the lateral dimension of the smallest package anticipated to be used with the area 12. This, together with the desired centering of the strips, will result in each strip having terminal ends 36' spaced from the sides 20 and 22.

At least one side pad 36 of hook material is centered in the longitudinal direction in proximity to each of the sides 20 and 22 on the inner face 24. Mating loop material side pads 38 are located adjacent each of the corners formed by the intersections of the ends and sides, on the outer face 26. The longitudinal length of the side pads should not exceed the minimum anticipated longitudinal length of the package 14.

The attachment of the area 12 about the package will now be described. With reference to FIG. 1, the area 12 is first laid out to its full extent with the inner face 24 uppermost. The package 14 is then substantially centered within the peripheral confines of the area. Where the package has a rectangular configuration in the position viewed in FIG. 1, it is preferred to have the longer dimension extending laterally, such that they are parallel to the longitudinal ends 16 and 18. The first longitudinal end 16 is then lifted over the package toward end 18, thus exposing end strip 34. Longitudinal end 18 is next similarly moved over the package and over end 16, and pressed downward such that the end strips 32 and 34 engage and are releasably fixed together.

As may be envisioned by reference to FIG. 2, the end strip 32 and mating end strip 34 must be in contact to form a bond, and as such must be in overlying relation. However, since the end strips are fixed to the area 12, their position in FIG. 2 is dependent upon package size. To increase the range of package sizes which may be covered by the area 12, the mating end strip 34 may be formed as, or include, auxiliary strips 34' extending perpendicular to the direction of the longitudinal ends (i.e., longitudinally). This will allow the ends strips to achieve the overlying relationship with a wider range of package sizes, and in particular packages having a range of lateral cross-sectional peripheral lengths substantially equal to the longitudinal length of the mating end strips.

From FIG. 2 it may be seen that in this position the centrally located side pads 36 are substantially centered across the lateral dimension of the package. Additionally, the mating side pads 38, located at the corners of the area 12 have bee placed at positions also substantially centered across the lateral dimension of the package. To bring these mating fasteners into the overlying relationship the chosen lateral side edge of area 12 is folded about the edges of the package extending between those remaining edges which have the side pads adjacent thereto. While holding these portions of area 12 in position, the portion of area 12 containing the mating side pads 38 is folded about that adjacent edge of the package, and then this process is also repeated for the portion of area 12 containing the side pads 36.

This will bring the side pads 36 and 38 into overlying relation and allow them to be secured together. This entire process is then repeated for the remaining one of the lateral side edges 20 and 22. As with the mating side pads 34, the mating side pads 38 may be or include portions elongated in the lateral direction to allow the mating relationship with packages having a range of longitudinal cross-sectional peripheral lengths. Additionally, the side pads 36 and/or 38 may be elongated in the longitudinal direction of the area 12 to allow for the same package size variations as the elongations of the mating end strip 34.

Once this is completed, the area 12 is secured in covering relation about the package 12. The package may then be given to the intended recipient, who may remove the area 12 from covering relation, thus revealing the package 14, with a series of steps substantially opposite to those used described above. The giver, recipient, or other individual may then retain the area 12, unlike traditional disposable package wrapping. The area 12 may be cleaned if desired to improve its appearance, and may then be stored for further use as a package wrapping, following the steps described above. This cycle of use, cleansing and reuse may be repeated until wear sufficiently reduces the aesthetic appeal of the area that it may be discarded as waste, or employed as a rag or other secondary use item for the material forming the area 12.

As may be seen, the present invention provides an attractive package wrapping capable of numerous aesthetic variations, and which may be employed with a fairly wide range of package sizes for each particular size of area 12. Furthermore, the present invention is reusable, thus saving precious natural resources, both as a wrapping, and as a secondary use item once it is worn.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A reusable package wrapping, comprising:
   a substantially rectangular area of material, said area including first and second longitudinal ends and first and second lateral side edges, an inner face, an outer face, and at least localized portions of substantial flexibility, said material being adapted to be wrapped about a package in covering relation; and
   a plurality of retaining elements located at spaced positions about said periphery of said area, said retaining elements including a first and a second end strip, each mounted to said area adjacent a respective associated one of said longitudinal ends, said first end strip comprising an elongated strip extending substantially parallel to said associated longitudinal end, said second end strip including an elongated strip extending substantially parallel to said associated longitudinal end, said second end strip having a length less than that of said associated longitudinal end such that said second end strip defines terminal ends which are spaced from said side edges, and said second end strip further including a plurality of elongated auxiliary strips extending substantially perpendicular to said associated longitudinal end, each of said auxiliary strips having an end located in proximity to said elongated strip extending parallel to said longitudinal end and being intermediate said terminal ends, said first end strip being formed of one of a hook or a loop fastener material, and said second end strip being formed of the other of said hook or loop fastener material.

2. A reusable package wrapping as in claim 1, wherein said retaining elements include at least one side pad mounted to said area adjacent each of said lateral side edges, said side pad being capable of being releasably fixed to other portions of said area.

3. A reusable package wrapping as in claim 2, wherein said first end strip and said side pad are located on said inner face, and said second end strip is mounted to said area on the outer face thereof, and further including at least one mating side pad mounted on said area on said outer face.

4. A reusable package wrapping as in claim 1, wherein said material forming said area is a woven fabric.

5. A reusable package wrapping as in claim 1, wherein said material forming said area includes a woven fabric.

* * * * *